3,445,461
STEROID DIAZIRINES AND DIAZIRIDINES AND
A PROCESS FOR PRODUCING SAME
Poul Borrevang and Peter Faarup, Copenhagen, Denmark,
assignors to Novo Terapeutisk Laboratorium A/S,
Copenhagen, Denmark, a Danish company
No Drawing. Filed Aug. 5, 1965, Ser. No. 477,602
Claims priority, application Great Britain, Aug. 12, 1964,
32,814/64; May 25, 1965, 22,075/65
Int. Cl. C07c 173/10, 167/00
U.S. Cl. 260—239.5                            13 Claims

ABSTRACT OF THE DISCLOSURE

Derivatives of the pregnane series and of 17,17-lower dialkyl steroids which carry a spiro-diazirine group, a spiro-diaziridine group or substituted spiro-diaziridine group in the 3-position are disclosed. These compounds may be prepared by reaction of chloramine in the presence of ammonia with the corresponding steroid which has in the 3-position a carbonyl group, an imino group or a group convertible to an imino group under the conditions of the reaction. The new compounds show antiandrogenic properties and compounds may be obtained with gestagenic effect.

---

The present invention relates to new and useful steroid compounds and to a process for preparing such compounds.

The new compounds of the invention have in 3-position in the steroid molecule a 3-membered ring system containing two nitrogen atoms and one carbon atom, the latter being carbon atom number 3 in the A-ring of the steroid molecule. Thus, the new compounds of the invention may be defined as steroids carrying in 3-position a spiro-diazirine or a spiro-diaziridine ring, which latter may carry substituents.

It has been found that by the introduction of the spiro-diaziridine or spiro-diazirine ring system into 3-position of certain classes of steroids as defined below there may be obtained compounds of pharmacological value. For example, there may be obtained compounds showing antiandrogenic properties (in the pregnane series there may be obtained compounds showing antiandrogenic properties with no demonstrable gestagenic effect), further, there may be obtained compounds with gestagenic effect, and in the pregnane series it has been found possible to obtain no androgenic effect at all, but very interesting anabolic properties.

It has further been found that the new steroid compounds of the invention are useful as intermediates for the preparation of other steroid compounds.

More specifically, the compounds of the invention have the general Formula I

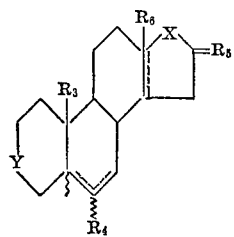

(I)

in which Y means one of the groups

and

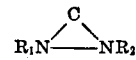

wherein each of the symbols $R_1$ and $R_2$ means hydrogen, alkyl, cycloalkyl, hydroxyalkyl, aralkyl, aryl or halogen-aryl, $R_3$ means hydrogen or methyl, $R_4$ means hydrogen, methyl, or halogen, $R_5$ means two hydrogen atoms, hydrogen and methyl, hydrogen and hydroxyl, or a methylene group, and X means

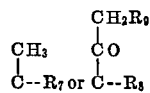

the compounds having, when X means

a $\Delta^{13}$ double bond and no group $R_6$, while $R_7$ means lower alkyl, preferably methyl or ethyl, whereas when X is

the compounds have no $\Delta^{13}$ double bond, while $R_6$ means lower alkyl, preferably methyl, $R_8$ means hydrogen, alkyl, hydroxyl or an ester group, for example an acetate group or a higher ester group, e.g. a caproate group, and $R_9$ means hydrogen or halogen, with the addition that when $R_5$ is hydrogen and hydroxy, and $R_8$ is hydroxy, the two hydroxy groups may together form a ketal or acetal structure as shown by the below partial formula

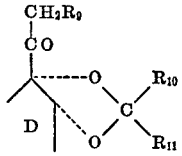

wherein each of the groups $R_{10}$ and $R_{11}$ means hydrogen, lower alkyl, phenyl, or substituted phenyl.

Concerning the meaning of the symbols $R_1$ and $R_2$, $1'(2')$ - methyl-diaziridines and $1'(2')$ - ethyl-diaziridines may be mentioned as examples of compounds wherein $R_1$ and $R_2$ mean hydrogen and alkyl, $1'(2')$-β-hydroxy-ethyl-diaziridines may be mentioned as examples of compounds wherein $R_1$ and $R_2$ mean hydrogen and hydroxy-alkyl, $1'(2')$-benzyl-diaziridines may be mentioned as examples of compounds wherein $R_1$ and $R_2$ mean hydrogen and aralkyl, and $1',2'$-dimethyl-diaziridines may be mentioned as examples of compounds wherein both $R_1$ and $R_2$ mean alkyl.

Concerning the meaning of the symbol $R_8$, caproates and valerates may be mentioned as examples of compounds wherein $R_8$ means a higher ester group.

An important class of the compounds of the invention are steroids of the general Formula IV

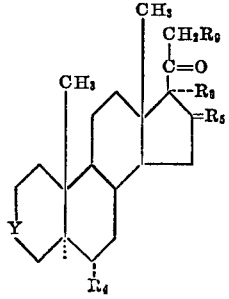

(IV)

wherein Y means

or

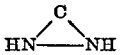

and $R_4$, $R_5$, $R_8$ and $R_9$ are as defined above, and among these, the steroids of the general Formula V

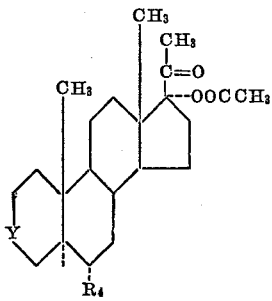

(V)

wherein Y means

or

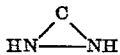

and $R_4$ is as defined above, are of special interest.

Another very important class of the compounds of the invention are steroids of the general Formula VI

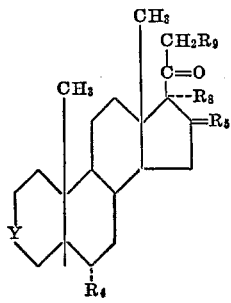

(VI)

wherein Y means

or

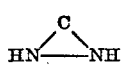

and $R_4$, $R_5$, $R_8$ and $R_9$ are as defined above, and of these, the steroids of the general Formula VII

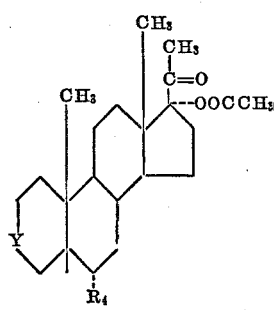

(VII)

wherein Y means

or

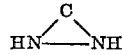

and $R_4$ is as defined above, are of special interest, as, among these compounds, there are some showing a very strong antiandrogenic effect.

A further very important class of the compounds of the invention are steroids of the general Formula VIII

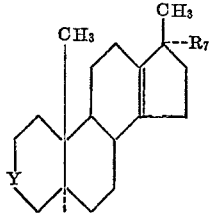

(VIII)

wherein Y means

or

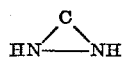

and $R_7$ is as defined above. Also among these compounds, there are some showing a very strong antiandrogenic effect.

As specific examples of interesting compounds of the invention there may be mentioned 5α-pregnane-20-one-3-spiro-3′-diazirine and -diaziridine,
17α-acetoxy-5α-pregnane-20-one-3-spiro-3′-diazirine and -diaziridine,
17α-acetoxy-5β-pregnane-20-one-3-spiro-3′-diazirine and -diaziridine,
6α-methyl-17α-acetoxy-5α-pregnane-20-one-3-spiro-3′-diazirine and -diaziridine,
6α-methyl-17α-acetoxy-5β-pregnane-20-one-3-spiro-3′-diazirine and -diaziridine,
6α-chloro-17α-acetoxy-5α-pregnane-20-one-3-spiro-3′-diazirine and -diaziridine,
6α-chloro-17α-acetoxy-5β-pregnane-20-one-3-spiro-3′-diazirine and -diaziridine,
21-fluoro-17α-acetoxy-5β-pregnane-20-one-3-spiro-3′-diazirine and -diaziridine,
21-fluoro-6α-methyl-17α-acetoxy-5β-pregnane-20-one-3-spiro-3′-diazirine and -diaziridine,
6-methyl-17α-acetoxy-Δ⁵-pregnene-20-one-3-spiro-3′-diazirine and -diaziridine,
6-chloro-17α-acetoxy-Δ⁵-pregnene-20-one-3-spiro-3′-diazirine and -diaziridine,
21-fluoro-17α-acetoxy-Δ⁵-pregnene-20-one-3-spiro-3′-diazirine and -diaziridine,
6-methyl-17α-acetoxy-Δ⁶-pregnene-20-one-3-spiro-3′-diazirine and -diaziridine,
17α-acetoxy-16α-methyl-5α-pregnane-20-one-3-spiro-3′-diazirine and -diaziridine,
17α-acetoxy-16α-methyl-5β-pregnane-20-one-3-spiro-3′-diazirine and -diaziridine,
17α-acetoxy-16-methylene-5β-pregnane-20-one-3-spiro-3′-diazirine and -diaziridine,
6α,16α-dimethyl-17α-acetoxy-5β-pregnane-20-one-3-spiro-3′-diazirine and -diaziridine,
6α,16α-dimethyl-17α-acetoxy-5α-pregnane-20-one-3-spiro-3′-diazirine and -diaziridine,
16α,17α-isopropylidenedioxy-5α-pregnane-20-one-3-spiro-3′-diazirine and -diaziridine,
16α,17α-isopropylidenedioxy-5β-pregnane-20-one-3-spiro-3′-diazirine and -diaziridine,
16α,17α-isopropylidenedioxy-6α-methyl-5β-pregnane-20-one-3-spiro-3′-diazirine and -diaziridine,
16α,17α-isopropylidenedioxy-6α-chloro-5β-pregnane-20-one-3-spiro-3′-diazirine and -diaziridine, 16α,17α-dihydroxy-5β-pregnane-20-one-3-spiro-3′-diazirine or -diaziridine benzaldehyde acetal and the corresponding 5α-pregnane compounds, 16α,17α-dihydroxy-5β-pregnane-20-one-3-spiro-3′-diazirine or -diaziridine methyl phenyl ketal and the corresponding 5α-pregnane compounds, 21-fluoro-16α,17α-isopropylidenedioxy-5α-pregnane-20-one-3-spiro-3′-diazirine and -diaziridine, 17α-hexanoyloxy-5α-pregnane-20-one-3-spiro-3′-diazirine and -diaziridine, 17α-hexanoyloxy-5β-pregnane-20-one-3-spiro-3′-diazirine and -diaziridine, 6α-methyl-17α-hexanoyloxy-5α-pregnane-20-one-3-spiro-3′-diazirine and -diaziridine, 6α-methyl-17α-hexanoyloxy-5β-pregnane-20-one-3-spiro-3′-diazirine and -diaziridine, and 17,17-dimethyl-18-nor-5α-Δ$^{13}$-androstene-3-spiro-3′-diaziridine and -diaziridine.

The process of the invention is in principle characterized by introducing into 3-position of a steroid of the partial formula

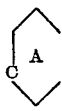

a group of the formula

or

wherein Q and Q′ are hydrogen or substituents.

More specifically, the process of the invention for the preparation of steroids of the general Formula I is characterized by treating a steroid of the general Formula II

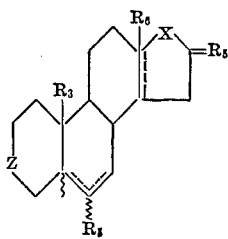

(II)

wherein the symbols X and $R_3$, $R_4$, $R_5$ and $R_6$ have the meanings defined above, or of the general Formula III

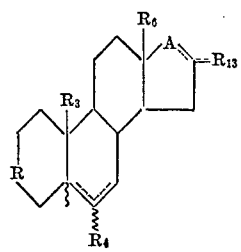

(III)

wherein the symbols $R_3$, $R_4$ and $R_6$ have the meanings defined above, and wherein, when the Δ$^{16}$ double bond is present, A means

in which $R_9$ has the meaning defined above and $R_{12}$ means an oxygen atom or hydrogen and hydroxy, while $R_{13}$ means a hydrogen atom or a methyl group, or, when the Δ$^{16}$ double bond is not present, A means

in which $R_8$ and $R_9$ have the meanings defined above, and $R_{13}$ has the same meaning as defined above for $R_5$ (including the ketal or acetal formation with $R_8$), while Z in the above Formulas II and III is a carbonyl or imino group or a derivative thereof which is convertible into an imino group, with a reactive amine derivative such as $NH_2R$ or $R'NHR$ wherein R is an acid residue and R′ has the same meaning as defined above for $R_1$ and $R_2$ (other than hydrogen), in the presence of $NH_3$ and/or another basic-reacting agent, If desired oxidizing a diaziridine group resulting from the above treatment to form a diazirine group, If using as starting steroid a compound of the Formula III oxidizing (if necessary) the product resulting from one of the aforementioned operations to form a 3-spiro-3′-diazirine steroid comprised by the general Formula I, If desired esterifying a 17α-hydroxy-containing 3-spiro-3′-diazirine steroid obtained in one of the above manners to form a 17α-ester, If desired converting a 16α,17α-dihydroxy-3-spiro-3′-diazirine obtained into a ketal or acetal of the partial formula indicated above, and If desired converting a diazirine group obtained into a monosubstituted diaziridine group.

By the term "imino group" is meant as well an unsubstituted as a substituted imino group.

It will be understood that the reactive group in the steroid may not only be a carbonyl group or an imino group, but also a derivative thereof which is convertible into an imino group. Without limiting the scope of the invention to any theory it is believed that an imino group, if not present in the starting steroid, is formed intermediately during the reaction. As illustrating examples of suitable steroid starting materials may be mentioned 3-keto steroids, steroids carrying in 3-position an unsubstituted imino group, Schiff's bases and steroids carrying in 3-position a hydrazone group which may be substituted.

Examples of reactive amine derivatives are hydroylamine-O-sulfonic acid, chloramine, N-alkyl-hydroxylamine-O-sulfonic acid, and N-alkyl-chloramine. It will be recognized that these illustrating examples of reactive amine derivatives correspond to the general formulas $NH_2R$ and $R'NHR$, the acid residue R being $OSO_2OH$ or chlorine.

The process of the invention may be carried out for instance from −30 to −40° C. up to room temperature or even higher. Sometimes it is preferred to carry out main part of the reaction at about 0 to 5° C. and let the reaction complete at room temperature. As solvent medium may be used various commonly used solvents with the proviso that the solvent used must not be one which reacts with the reactants used. As illustrating examples of suitable solvents may be mentioned methanol and dioxane. Though the use of dry solvents is often preferred, the process may also be carried out in the presence of water, especially when using a reactive amine derivative containing the group $OSO_2OH$.

When the desired reaction product is a 3-spiro-3′-diaziridine steroid in which the diaziridine group is unsubstituted, suitable embodiments of the process of the invention comprise treating a steroid of the general Formula II wherein Z is as defined above, with hydroxylamine-O-sulfonic acid or chloramine in the presence of $NH_3$, chloramine being used in the proportion of one mole of chloramine to one mole of the steroid. Examples of suitable steroid starting materials are 3-keto steroids, steroids carrying in 3-position an unsubstituted imino group, Schiff's bases, and steroids carrying in 3-position a hydrazone group. When using as starting compounds steroids carrying in 3-position an unsubstituted imino group, another basic-reacting agent, for instance potassium hydroxide, may be used instead of $NH_3$, though $NH_3$ is preferred.

When the desired reaction product is a 3-spiro-3'-diazirine steroid, suitable embodiments of the process of the invention comprise treating a steroid of the general Formula II wherein Z is as defined above, with an excess of chloramine in the presence of $NH_3$. It is believed that in this process, which provides a most simple way of producing the diazirines, the chloramine itself acts as an oxidizing agent for the diaziridine group. Examples of suitable steroid starting materials are 3-keto steroids, steroids carrying in 3-position an unsubstituted imino group, Schiff's bases, and steroids carrying in 3-position a hydrazone group. When using as starting compounds steroids carrying in 3-position an unsubstituted imino group, another basic-reacting agent may be used instead of $NH_3$, though $NH_3$ is preferred.

According to the invention, a further suitable method of preparing 3-spiro-3'-diazirine steroids is by oxidizing a 3-spiro-3'-diaziridine steroid in which the diaziridine group is unsubstituted, by means of an oxidizing agent, for example bromine, silver oxide, tertiary butyl hypochlorite or chromium trioxide.

It is often preferred to use bromine as the oxidizing agent, because in most cases bromine has been found to react selectively with the diaziridine group, without affecting the remaining constitution of the steroid treated.

When the desired reaction product is a 1'(2')-substituted 3-spiro-3'-diaziridine steroid, suitable embodiments of the process of the invention comprise treating a steroid of the general Formula II wherein Z means a carbonyl group, with hydroxylamine-O-sulfonic acid or chloramine in the presence of $R'NH_2$ wherein $R'$ is as defined above. Other suitable embodiments comprise treating steroids of the general Formular II, wherein Z means an amino group substituted with R', with hydroxylamine-O-sulfonic acid or chloramine in the presence of a basic-reacting agent other than $NH_3$, preferably an amine. Further suitable embodiments comprise treating a steroid of the general Formula II wherein Z means a carbonyl group, with $R'NHOSO_2OH$ or $R'NHCl$ in the presence of $NH_3$. Still further suitable embodiments comprise treating a steroid of the general Formula II wherein Z means an unsubstituted imino group, with $R'NHOSO_2OH$ or $R'NHCl$ in the presence of a basic-reacting agent, preferably $NH_3$.

A diazirine group may be converted into a monosubstituted diaziridine group for instance by Grignard synthesis.

When the desired reaction product is a 1',2'-disubstituted 3-spiro-3'-diaziridine steroid, suitable embodiments of the process of the invention comprise treating a steroid of the general Formula II wherein Z means a carbonyl group, with $R'NHOSO_2OH$ or $R'NHCl$ in the presence of $R'NH_2$, in which formulas each $R'$ is one of the groups $R_1$ and $R_2$ as defined above (other than hydrogen). Other suitable embodiments comprise treating a steroid of the general Formula II wherein Z means an R'-substituted imino group, with $R'NHOSO_2OH$ or $R'NHCl$, wherein each $R'$ is one of the groups $R_1$ and $R_2$ as defined above (other than hydrogen), in the presence of a basic-reacting agent other than $NH_3$, preferably an amine.

While steroids of the general Formula I wherein $R_8$ is an ester group can be prepared from a starting material already containing the desired ester group, using as reactive amine derivative for example $NH_2Cl$ or $R'NHCl$, a further suitable method for the preparation of 17α-ester-3-spiro-3'-diazirine steroids is by treating a 17α-hydroxy-3-spiro-3'-diazirine steroid with an acid anhydride or mixed anhydride in the presence of p-toluene sulfonic acid.

If a steroid of the general Formula III is used as starting material, an oxidation is necessary to convert the product obtained in the main reaction into a desired end product. If, for example, the starting material is a steroid of the general Formula III containing a 20-hydroxy-group, the 20-hydroxy-group must be oxidized to form a 20-keto group. In some cases, this oxidation may be carried out simultaneously with a possible conversion of a diaziridine group into a diazirine group.

16α,17α-dihydroxy-3-spiro-3'-diazirine steroids in which no $\Delta^{13}$ double bond is present may readily be prepared using as starting material a 16α,17α-dihydroxy steroid corresponding to the general Formula II, but they may also be prepared from steroids of the general Formula III wherein the $\Delta^{16}$ double bond is present, the hydroxy groups in the 16α- and 17α-positions being introduced by oxidation subsequently to the main reaction.

Also, 17α - hydroxy-16-methylene-3-spiro-3'-diazirine steroids in which no $\Delta^{13}$ double bond is present may be prepared as well from starting materials corresponding to the general Formula II as from starting materials of the general Formula III. In the latter case, a starting material containing a $\Delta^{16}$ double bond and a 16-methyl group is used, and subsequently to the main reaction an oxidizing and dehydrating is performed.

Further, 16α,17α-dihydroxy-3-spiro-3'-diazirine ketals or acetals corresponding to the general Formula I may be prepared as well by introducing the diazirine group into a steroid already containing the ketal or acetal group desired as by reacting a 16α,17α-dihydroxy-3-spiro-3'-diazirine steroid corresponding to the general Formula II with the appropriate carbonyl compound in the presence of an acidic catalyst.

The following examples illustrate the invention.

EXAMPLE 1

17α-acetoxy-5β-pregnane-20-one-3-spiro-3'-diazirine (1) 17α - acetoxy - 5β - pregnane-20-one-3-spiro-3'-diaziridine.—2.7 g. of 17α-acetoxy-5β-pregnane-3,20-dione were dissolved in 250 ml. of dry methanol. The solution was cooled in a mixture of ice and water, and 19.0 ml. of methanolic ammonia (3.8 molar) were added. 0.95 g. of hydroxylamine-O-sulfonic acid (96%) was added portionwise with stirring. The reaction mixture was stirred and cooled for a couple of hours and was then allowed to stand at room temperature for about 14 hours. Thereafter the reaction mixture was evaporated almost to dryness in vacuo, methylene chloride was added, the mixture was shaken out three times with water, and the methylene chloride phase was dried over $Na_2SO_4$ and evaporated to dryness in vacuo. The resulting residue (weighing 2.6 g.) consisted of 17α-acetoxy-5β-pregnane-20-one-3-spiro-3'-diaziridine. The infrared spectrum (KBr) showed characteristic bands at 1245 cm.$^{-1}$ (C—O—C)

1712 cm.$^{-1}$ (C=O), 1731 cm.$^{-1}$ (C=O, acetate), and 3180, cm.$^{-1}$ (NH).

(2) 17α-acetoxy-5-β-pregnane-20-one-3-spiro-3ι-diazirine.—2.4 g. of the above 3-diazirdine (crude) were dissolved in 100 ml. of chloroform. The solution was cooled in a mixture of ice and water, and 5.0 ml. of triethylamine were added. A solution of 1.0 g. of $Br_2$ in 20.0 ml. of chloroform was added dropwise with stirring in the course of about ½ hour. After stirring for additionally ½ hour the reaction mixture was shaken out three times with water, dried over $Na_2SO_4$ and evaporated to dryness in vacuo. The residue was treated with methanol, which caused the residue to crystallize, and after separation by filtration and recrystallization from methanol there was obtained 1.3 g. of the 17α-acetoxy-5β-pregnane-20-one-3-spiro-3'-diazirine with a melting point of 140–141° C.

The infrared spectrum (KBr) showed characteristic bands at 1249 cm.$^{-1}$ (C—O—C), 1568 cm.$^{-1}$ and 1583 cm.⁻¹ (N=N), 1715 cm.⁻¹ (C=O), and 1730 cm.⁻¹ (C=O, acetate).

*Analysis.*—Calculated for $C_{23}H_{34}N_2O_3$: C=71.47%; H=8.87%; N=7.25%. Found: C=71.66%; H=8.69%; N=7.44%.

In biological tests, 17α-acetoxy-5β-pregnane-20-one-3-spiro-3'-diazirine showed antiandrogenic effect.

EXAMPLE 2

6α-methyl-17α-acetoxy-5β-pregnane - 20 - one - 3 - spiro-3'-diaziridine 4.0 g. of 6α-methyl-17α-acetoxy-5β - pregnane - 3,20-dione were dissolved in 200 ml. of dry methanol. Thereafter the procedure described in Example 1, 1 was followed, adding 20.0 ml. of methanolic ammonia (5.0 molar) and 1.3 g. of hydroxylamine - O - sulfonic acid (97.5%). After recrystallization of the residue from methanol there was obtained 2.4 g. of 6α-methyl-17α-acetoxy-5β-pregnane - 20 - one - 3 - spiro - 3' - diaziridine with a melting point of 198–205° C. (Heating of the sample started at 190° C.) The infrared spectrum (KBr) showed characteristic bands at 1243 cm.⁻¹ (C—O—C), 1706 cm.⁻¹ (C=O), 1734 cm.⁻¹ (C=O, acetate), and 3240 cm.⁻¹ (NH).

*Analysis.*—Calculated for $C_{24}H_{38}N_2O_3$: C=71.60%; H=9.51%; N=6.96%. Found: C=71.63%; H=9.53%; N=7.00%.

In biological tests, 6α-methyl-17α-acetoxy-5β-pregnane-20-one-3-spiro-3'-diaziridine showed antiandrogenic effect.

EXAMPLE 3

6α-methyl-17α-acetoxy-5α-pregnane-20-one-3-spiro-3'-diazirine

To 1.0 g. of the 3-diaziridine compound described in Example 2 were added 100 ml. of ether and 0.7 ml. of triethylamine. The resulting suspension was cooled in ice-water and while stirring a solution of 0.4 g. of Br₂ in 15.0 ml. of carbon tetrachloride was added in the course of 30 minutes. After further stirring for ½ hour ethyl acetate was added and washing once with a NaHCO₃ solution and twice with water was performed. After drying over Na₂SO₄ the solution was evaporated to dryness in vacuo.

The resulting residue was recrystallized from methanol, and in this manner there was obtained 0.7 g. of 6α-methyl - 17α - acetoxy - 5β - pregnane - 20 - one - 3-spiro-3-diazirine with a melting point of 145–149° C. (Heating of the sample started at 140° C.) The infrared spectrum (KBr) showed characteristic bands at 1246 cm.⁻¹ (C—O—C), 1568 cm.⁻¹ and 1582 cm.⁻¹ (N=N), 1711 cm.⁻¹ (C=O), and 1728 cm.⁻¹ (C=O, acetate).

*Analysis.*—Calculated for $C_{24}H_{36}N_2O_3$: C=71.97%; H=9.06%; N=6.99%. Found: C=71.93%; H=9.11%; N=6.98%.

In biological tests, 6α-methyl-17α-acetoxy-5β-pregnane-20-one-3-spiro-3'-diazirine showed a very strong antiandrogenic effect and no demonstrable gestagenic effect.

EXAMPLE 4

5α-pregnane-20-one-3-spiro-3'-diaziridine 5.0 g. of 5α-pregnane-3,20-dione were admixed with 250 ml. of dry methanol and treated as described in Example 1 (1), adding 35.0 ml. of methanolic ammonia (4.6 molar) and 2.1 g. of hydroxylamine-O-sulfonic acid (98%). After working up the residue was treated with ethyl acetate, which caused the residue to crystallize, and on separation by filtration there was obtained 3.7 g. of 5α-pregnane-20-one-3-spiro - 3' - diaziridine. After recrystallization from ethyl acetate a melting point of 181–182° C. was obtained. The infrared spectrum (KBr) showed characteristic bands at 1703 cm.⁻¹ (C=O) and 3205 cm.⁻¹ (NH).

*Analysis.*—Calculated for $C_{21}H_{34}N_2O$: N=8.48%. Found: N=8.55%.

EXAMPLE 5

5α-pregnane-20-one-3-spiro-3'-diazirine

The residue obtained after working up as described in Example 4 was admixed with 10.0 ml. of triethylamine and treated in the same manner as described in Example 1(2), adding dropwise a solution of 2.5 g. of Br₂ in 50 ml. of chloroform. After working up the residue was dissolved in benzene and chromatographed over silica gel (40 g.). After eluation with benzene and evaporation to dryness in vacuo the resulting residue was recrystallized from methanol, yielding 1.6 g. of 5α-pregnane-20-one-3-spiro-3-diazirine with a melting point of 141–142° C. From the mother liquor additional 1.0 g. of the substance was obtained.

The infrared spectrum (KBr) showed characteristics bands at 1576 cm.⁻¹ (N=N) and 1700 cm.⁻¹ (C=O).

*Analysis.*—Calculated for $C_{21}H_{32}N_2O$: C=76.78%; H=9.82%; N=8.53%. Found: C=76.77%; H=9.70%; N=8.81%.

EXAMPLE 6

17α-acetoxy-5α-pregnane-20-one-3-spiro-3'-diaziridine 10.3 g. of 17α-acetoxy-5α-pregnane-3,20-dione were dissolved in 1000 ml. of dry methanol and treated in the same manner as described in Example 1(1), adding 36.0 ml. of methanolic ammonia (6.8 molar) and 3.7 g. of hydroxylamine-O-sulfonic acid (97%). After working up the resulting residue was treated with acetone, which caused it to crystallize, and on separation by filtration there was obtained 6.8 g. of 17α-acetoxy-5α-pregnane-20-one-3-spiro-3'-diaziridine. After recrystallization from acetone a melting point of 217–221° C. was obtained.

The infrared spectrum (KBr) showed characteristic bands at 1245 cm.⁻¹ (C—O—C), 1705 cm.⁻¹ (C=O), 1735 cm.⁻¹ (C=O, acetate), and 3260 cm.⁻¹ (NH).

*Analysis.*—Calculated for $C_{23}H_{36}N_2O_3$: C=71.10%; H=9.34%; N=7.21%. Found: C=71.00%; H=9.23%; N=7.17%.

In biological tests, 17α-acetoxy-5α-pregnane-20-one-3-spiro-3'-diaziridine showed gestagenic effect.

EXAMPLE 7

17α-acetoxy-5α-pregnane-20-one-3-spiro-3'-diazirine 3.7 g. of the 3-diaziridine compound described in Example 6 were dissolved in 100 ml. of chloroform and treated in the same manner as described in Example 1(2), adding 7.0 ml. of triethylamine and dropwise a solution of 1.5 g. of Br₂ in 25.0 ml. of chloroform. After working up the residue was treated with methanol, which caused it to crystallize. After separation by filtration and recrystallization from methanol there was obtained 2.05 g. of 17α-acetoxy-5α-pregnane-20-one-3-spiro-3'-diazirine with a melting point of 183–187° C. (by slow heating of the sample). The infrared spectrum (KBr) showed characteristic bands at 1243 cm.⁻¹ (C—O—C), 1572 cm.⁻¹ (N=N), 1708 cm.⁻¹ (C=O), and 1737 cm.⁻¹ (C=O, acetate).

*Analysis.*—Calculated for $C_{23}H_{34}N_2O_3$: C=71.47%; H=8.87%; N=7.25%. Found (after drying in vacuo at 25° C. for 48 hours): C=71.63%; H=8.71%; N=7.24%.

In biological tests, 17α-acetoxy-5α-pregnane-20-one-3-spiro-3'-diazirine showed no androgenic effect at all, but very interesting anabolic properties.

EXAMPLE 8

17,17-dimethyl-18-nor-5α-Δ¹³-androstene-3-spiro-3'-diaziridine (A) 2.8 g. of 17,17-dimethyl-18-nor-5α-Δ¹³-androstene-3-one were dissolved in 350 ml. of dry methanol and treated in the same manner as described in Example 1(1), adding 8.7 ml. of methanolic ammonia (4.6 molar) and 1.4 g. of hydroxylamine-O-sulfonic acid (98%). After working up, acetone was added to the residue, and on separation by filtration 0.4 g. of 17,17-dimethyl-18-nor-5α-Δ13-androstene-3-spiro-3′-diaziridine was obtained. After recrystallization from 80% ethanol a melting point of 131–133° C. was obtained. The infrared spectrum (KBr) showed a characteristic band at 3175 cm.$^{-1}$ (NH).

*Analysis.*—Calculated for $C_{20}H_{32}N_2$, $\frac{1}{2}H_2O$: C=77.61%; H=10.75%; N=9.05%. Found: C=77.55%; H=10.63%; N=9.06%.

(B) 2.9 g. of 17,17-dimethyl-18-nor-5α-Δ13-androstene-3-one were dissolved in 275 ml. of dry methanol. The solution was cooled in a mixture of ice and water. Thereafter 10.5 ml. of methanolic ammonia (3.8 molar) were added, and in the course of ½ hour 43 ml. of a solution of chloramine in ether (0.248 molar) was added dropwise while stirring. The solution was kept cool for a couple of hours and then allowed to stand at room temperature for about 15 hours. Thereafter there was evaporated to dryness in vacuo, methylene chloride was added, and the mixture was shaken out three times with water. The methylene chloride phase was dried over $Na_2SO_4$ and evaporated to dryness in vacuo. By addition of ethyl acetate to the residue and separation by filtration there was obtained 0.5 g. of the 3-diaziridine compound corresponding to the substance obtained by method A.

In biological tests, 17,17-dimethyl-18-nor-5α-Δ13-androstene-3-spiro-3′-diaziridine showed a very strong antiandrogenic effect.

EXAMPLE 9

17,17-dimethyl-18-nor-5α-Δ13-androstene-3-spiro-3′-diazirine 2.9 g. of 17,17-dimethyl-18-nor-5α-Δ13-androstene-3-one were dissolved in 275 ml. of dry methanol and treated as described in Example 8, method B, adding 6.0 ml. of methanolic ammonia (6.7 molar) and in one portion 189 ml. of a solution of chloramine in ether (0.212 molar). After working up, 99% ethanol was added to the residue, which caused the latter to crystallize, and after separation by filtration there was obtained 1.5 g. of 17,17-dimethyl-18-nor-5α-Δ13-androstene-3-spiro-3′-diazirine with a melting point of 67–69° C.

The infrared spectrum (KBr) showed a characteristic band at 1572 cm.$^{-1}$ (N=N).

*Analysis.*—Calculated for $C_{20}H_{30}N_2$: C=80.48%; H=10.13%; N=9.39%. Found: C=80.37%; H=9.89%; N=9.69%.

What we claim is:

1. Steroid compounds of the formula

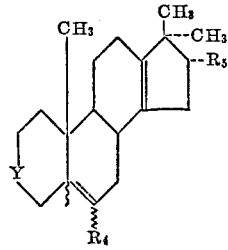

in which the dotted line between positions 5 and 6 denotes the optional presence of a double bond, Y is a member selected from the group consisting of

and

wherein each of $R_1$ and $R_2$ is a member selected from the group consisting of hydrogen, lower-alkyl, and benzyl, $R_4$ is a member selected from the group consisting of hydrogen, methyl, and chlorine, when the Δ5-double bond is present, and $R_4$ is a member selected from the group consisting of two hydrogen atoms, hydrogen and methyl, hydrogen and chlorine, when the Δ5-double bond is not present, and $R_5$ is a member selected from the group consisting of hydrogen and methyl.

2. 17,17 - dimethyl - 18 - nor-5α-Δ13-androstene-3-spiro-3′-diaziridine.

3. Steroid compounds of the formula

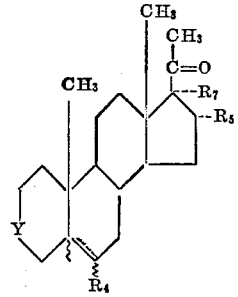

in which the dotted line between positions 5 and 6 denotes the optional presence of a double bond, Y is a member selected from the group consisting of

and

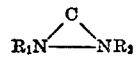

wherein each of $R_1$ and $R_2$ is a member selected from the group consisting of hydrogen, lower-alkyl, and benzyl, $R_4$ is a member selected from the group consisting of hydrogen, methyl, and chlorine, when the Δ5-double bond is present, and $R_4$ is a member selected from the group consisting of two hydrogen atoms, hydrogen and methyl, hydrogen and chlorine, when the Δ5-double bond is not present, $R_5$ is a member selected from the group consisting of hydrogen and methyl, and $R_7$ is a member selected from the group consisting of hydroxyl and hydroxyl esterified with a carboxylic acid containing up to 6 carbon atoms.

4. 6α - methyl - 17α - acetoxy-5β-pregnane-20-one-3-spiro-3′-diazirine.

5. 17α - acetoxy - 5α - pregnane-20-one-3-spiro-3′-diazirine.

6. 17α - acetoxy - 5β - pregnane - 20 - one-3-spiro-3′-diaziridine.

7. 17α - acetoxy - 5β - pregnane - 20 - one-3-spiro-3′-diazirine.

8. 6α - methyl - 17α - acetoxy - 5β - pregnane-20-one-3-spiro-3′-dialziridine.

9. 17α-acetoxy - 5α - pregnane - 20 - one-3-spiro-3′-dialziridine.

10. 3-spiro-3′-dialziridine derivatives of the pregnane series having the formula:

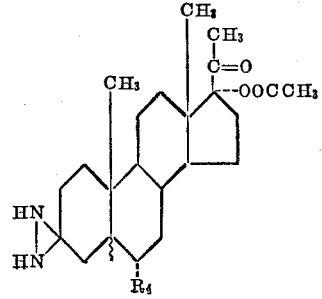

in which $R_4$ is a member selected from the group consisting of two hydrogen atoms, hydrogen and methyl, and hydrogen and chlorine.

11. 3-spiro-3'-diazirine derivatives of the pregnane series having the formula

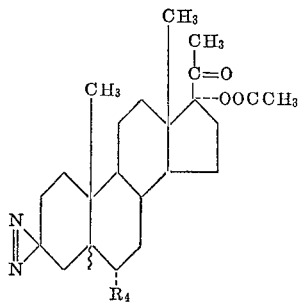

in which $R_4$ is a member selected from the group consisting of two hydrogen atoms, hydrogen and methyl, and hydrogen and chlorine.

12. A process of making steroids have the formula

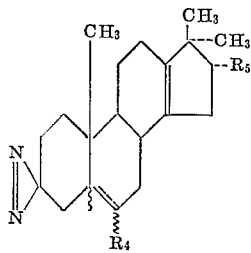

in which the dotted line between positions 5 and 6 denotes the optional presence of a double bond, $R_4$ is a member selected from the group consisting of hydrogen, methyl, and chlorine, when the $\Delta^5$-double bond is present, and $R_4$ is a member selected from the group consisting of two hydrogen atoms, hydrogen and methyl, and hydrogen and chlorine, when the $\Delta^5$-double bond is not present, and $R_5$ is a member selected from the group consisting of hydrogen and methyl which comprises reacting a molar excess of chloramine in the presence of ammonia with a steroid of the formula

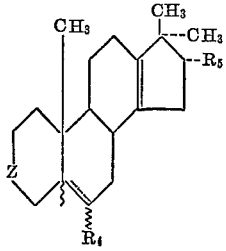

in which $R_4$ and $R_5$ are as defined above and

Z is a member selected from the group consisting of a carbonyl group, an imino group and a derivative thereof convertible into an imino group under the reaction conditions.

13. A process of making steroids of the formula

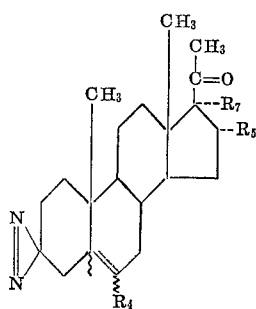

in which the dotted line between positions 5 and 6 denotes the optional presence of a double bond, $R_4$ is a member selected from the group consisting of hydrogen, methyl, and chlorine, when the $\Delta^5$-double bond is present, and $R_4$ is a member selected from the group consisting of two hydrogen atoms, hydrogen and methyl, hydrogen and chlorine, when the $\Delta^5$-double bond is not present, $R_5$ is a member selected from the group consisting of hydrogen and methyl, and $R_7$ is a member selected from the group consisting of hydroxyl and hydroxyl esterified with a carboxylic acid containing up to 6 carbon atoms, which comprises reacting a molar excess of chloramine in the presence of ammonia with a steroid of the formula

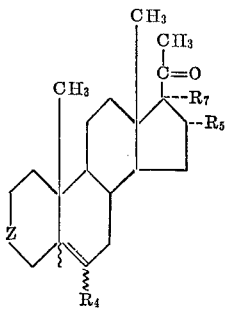

in which $R_4$, $R_5$ and $R_7$ are as defined above and

Z is a member selected from the group consisting of a carbonyl group, an imino group and a derivative thereof convertible into an imino group under the reaction conditions.

References Cited

UNITED STATES PATENTS 3,264,331 __ 8/1966 Robinson et al. ____ 260—397.5

OTHER REFERENCES

Schmitz et al.: Chemische Berichte, vol. 94, No. 8, 1961, pp. 2166–2173.

Church et al.: Journ. Amer. Chem. Soc., vol. 87, No. 12, 1965, pp. 2665–2671.

LEWIS GOTTS, *Primary Examiner.*

ETHEL G. LOVE, *Assistant Examiner.*

U.S. Cl. X.R.

260—239.55, 999